United States Patent
Khalil et al.

(10) Patent No.: US 10,938,332 B1
(45) Date of Patent: Mar. 2, 2021

(54) MODIFIED FLUX OBSERVER FOR SWITCHED RELUCTANCE MACHINES

(71) Applicant: Caterpillar Inc., Peoria, IL (US)

(72) Inventors: Ahmed Khalil, Dunlap, IL (US); James Thorne, Peoria, IL (US); Jackson Wai, Dunlap, IL (US); Amara Ashfaq, Dunlap, IL (US); Jesse Gerdes, Dunlap, IL (US)

(73) Assignee: Caterpillar Inc., Peoria, IL (US)

(*) Notice: Subject to any disclaimer, the term of this patent is extended or adjusted under 35 U.S.C. 154(b) by 0 days.

(21) Appl. No.: 16/594,797

(22) Filed: Oct. 7, 2019

(51) Int. Cl.
| | |
|---|---|
| *H02P 25/08* | (2016.01) |
| *H02P 25/092* | (2016.01) |
| *H02P 23/14* | (2006.01) |
| *H02P 25/089* | (2016.01) |
| *H02P 9/00* | (2006.01) |

(52) U.S. Cl.
CPC ............ *H02P 25/092* (2016.02); *H02P 9/009* (2013.01); *H02P 23/14* (2013.01); *H02P 25/089* (2016.02)

(58) Field of Classification Search
CPC ....... H02P 25/092; H02P 25/089; H02P 9/009
USPC ...................................................... 318/254.1
See application file for complete search history.

(56) References Cited

U.S. PATENT DOCUMENTS

| | | | |
|---|---|---|---|
| 5,864,217 A | 1/1999 | Lyons et al. | |
| 6,608,462 B2 | 8/2003 | Slater et al. | |
| 6,731,083 B2 | 5/2004 | Marcinkiewicz | |
| 6,853,163 B2 | 2/2005 | Slater | |
| 9,800,192 B1 | 10/2017 | Han et al. | |
| 2002/0149331 A1* | 10/2002 | Marcinkiewicz | .... B23K 20/121 318/254.1 |
| 2013/0221885 A1* | 8/2013 | Hunter | ...................... H02P 6/34 318/400.15 |
| 2018/0212543 A1* | 7/2018 | Morita | ................... H02P 21/141 |
| 2019/0305697 A1* | 10/2019 | Slater | ..................... H02P 1/163 |

FOREIGN PATENT DOCUMENTS

WO        2018104754 A2        6/2018

* cited by examiner

*Primary Examiner* — Erick D Glass
(74) *Attorney, Agent, or Firm* — Harrity & Harrity LLP

(57) ABSTRACT

A control system that includes a converter circuit and a control device is disclosed. The converter circuit may be configured to control a phase current of a switched reluctance machine. The control device may be configured to determine an estimated flux based on a bus voltage, a phase voltage, and a mutual voltage. The control device may be configured to determine a flux threshold based on the phase current, and determine a first limit and a second limit relative to the flux threshold. The first limit and the second limit may be scaled relative to the flux threshold based on one or more of the target speed, the load demand, or the bus voltage. The control device may be configured to compare the estimated flux with the first limit, and reset the estimated flux to the second limit based on determining that the estimated flux satisfies the first limit.

20 Claims, 4 Drawing Sheets

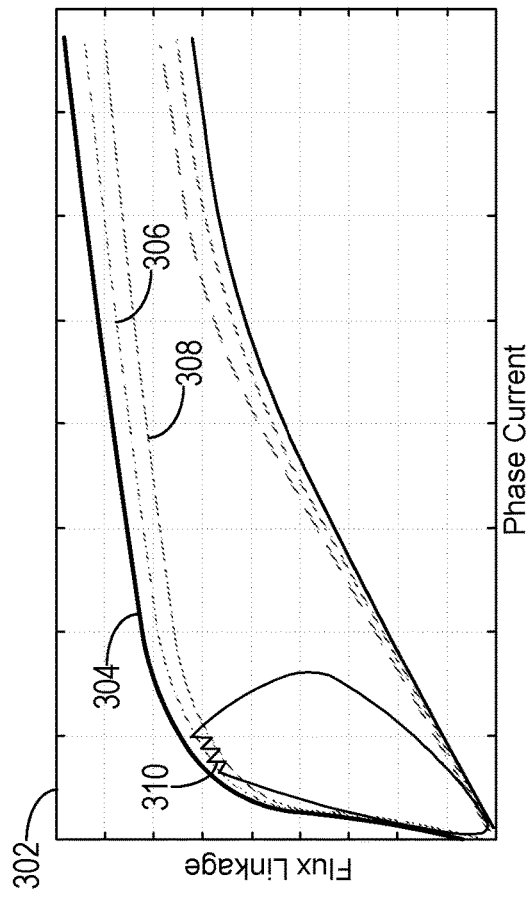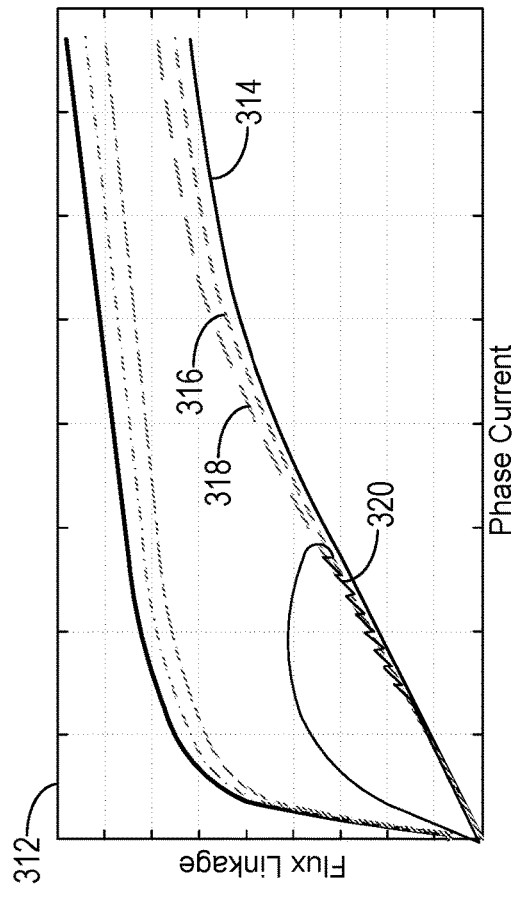

MODIFIED FLUX OBSERVER FOR SWITCHED RELUCTANCE MACHINES

TECHNICAL FIELD

The present disclosure relates generally to switched reluctance machines and, for example, to a modified flux observer for switched reluctance machines.

BACKGROUND

A switched reluctance machine (e.g., a switched reluctance motor or a switched reluctance generator) is a form of an electric motor that can be operated in a motoring mode to convert electrical input into mechanical (e.g., rotational) output, or in a generating mode to convert mechanical (e.g., rotational) input into electrical output. Unlike other types of electric motors, a switched reluctance machine provides phase windings on a stator rather than on a rotor, which provides for a more simplified and robust design. A switched reluctance machine is often used with an industrial work machine (e.g., a track type tractor, a wheel loader, and/or the like) that uses an electric drive system. For example, an electric drive system of a work machine may use a combustion engine to power a generator that generates electrical energy that can be used by the switched reluctance machine to propel and/or perform another mechanical function of the work machine. The electric drive system may also use the switched reluctance machine to generate electrical energy that can be used to power an auxiliary function and/or an accessory component of the work machine. Switched reluctance machines have received interest over other types of electric motors due to having a robust rotor design, emitting less heat, requiring fewer components, and being cost-effective. As popularity of switched reluctance machines continues to grow, so do efforts to further improve an efficiency of switched reluctance machines.

Efficiency of a switched reluctance machine depends on an ability of a controller of the switched reluctance machine to track a rotor position (e.g., an angular position of the rotor relative to the stator of the switched reluctance machine) and/or a rotor speed (e.g., an angular speed of the rotor relative to the stator) during operation. In some cases, an encoder, a mechanically aligned speed wheel, and/or another type of sensing device may be used to determine rotor position and/or speed. However, such sensor-based arrangements can be costly, complex, and prone to error. Sensorless solutions also exist in which the controller estimates rotor position and/or speed based on electrical properties of the switched reluctance machine. For example, some sensorless solutions estimate flux of a phase winding, estimate a phase current based on the estimated flux, and estimate rotor position and/or speed based on the estimated phase current. Although sensorless solutions overcome some of the drawbacks associated with sensor-based solutions, currently available sensorless solutions are still susceptible to error. For example, under certain operating conditions, the estimated flux may not have adequate opportunity to reset between cycles, and thereby be allowed to accumulate to levels that can render inaccurate rotor position and/or speed estimations.

In some cases, the estimated flux may be periodically reset by a controller to prevent the estimated flux from increasing or decreasing beyond reasonable limits and to avoid inaccurate rotor position and/or speed estimations. In particular, a controller may determine a flux threshold that corresponds to an operating condition of the switched reluctance machine, and compare the estimated flux with the flux threshold to ensure that the estimated flux remains within reasonable limits. For example, if the estimated flux exceeds the flux threshold, the controller may reset the estimated flux to the flux threshold that was exceeded. Resetting the estimated flux in this manner may help reduce unwanted accumulation in the estimated flux and associated errors. However, resetting the estimated flux to the flux threshold may cause unwanted saturation of the estimated flux at the flux threshold. When saturated, the estimated flux may not provide sufficient information to enable the controller to accurately identify phase current. Furthermore, without an accurate phase current estimation, the controller may be unable to accurately estimate the rotor position and/or speed.

One solution to reduce error in flux estimations and to improve accuracy of rotor position and/or speed estimations of a switched reluctance machine is disclosed in U.S. Pat. No. 9,800,192, issued to Han et al., and filed on Apr. 7, 2016 ("the '192 patent"). In particular, the '192 patent discloses a controller that provides a flux estimator module configured to determine an estimated flux based on, at least, a phase voltage and a mutual voltage. The '192 patent further discloses a flux resetting module that is configured to reset the estimated flux during certain conditions. The '192 patent discloses that, if the estimated flux equals or exceeds an upper flux limit, then the estimated flux resets to the value of the upper flux limit, and if the estimated flux is less than or equal to a lower flux limit, then the estimated flux resets to the lower flux limit. However, the '192 patent does not disclose a method or a system that prevents saturation of the estimated flux in a manner that would further improve the accuracy of rotor position and/or speed estimations.

A modified flux observer of the present disclosure overcomes one or more of the shortcomings set forth above.

SUMMARY

According to some implementations, an electric drive system may include a switched reluctance machine, a converter circuit, and a control device. The switched reluctance machine may include a stator and a rotor rotatably disposed relative to the stator. The stator may include a plurality of phase windings, and the rotor may include a plurality of poles configured to magnetically interact with the plurality of phase windings. The converter circuit may be in electrical communication with the plurality of the phase windings. The converter circuit may be configured to control a phase current of a phase winding of the stator according to a switching command. The control device may be in electrical communication with the converter circuit. The control device may be configured to determine the switching command based on one or more of a target speed, a target torque, or a load demand associated with the switched reluctance machine, determine an estimated flux of the phase winding based on a bus voltage of the converter circuit, a phase voltage of the phase winding, and a mutual voltage associated with the phase winding, determine a flux threshold of the phase winding based on the phase current, determine a first limit and a second limit relative to the flux threshold, the first limit and the second limit being scaled relative to the flux threshold based on one or more of the target speed, the load demand, or the bus voltage, compare the estimated flux with the first limit, and reset the estimated flux to the second limit based on determining that the estimated flux satisfies the first limit.

According to some implementations, a control system may include a converter circuit and a control device. The converter circuit may be in electrical communication with a phase winding of a switched reluctance machine. The converter circuit may be configured to control a phase current of the phase winding according to a switching command. The control device may be in electrical communication with the converter circuit. The control device may be configured to determine the switching command based on one or more of a target speed, a target torque, or a load demand associated with the switched reluctance machine, determine an estimated flux of the phase winding based on a bus voltage of the converter circuit, a phase voltage of the phase winding, and a mutual voltage associated with the phase winding, determine a flux threshold of the phase winding based on the phase current, determine a first limit and a second limit relative to the flux threshold, the first limit and the second limit being scaled relative to the flux threshold based on one or more of the target speed, the load demand, or the bus voltage, compare the estimated flux with the first limit, and reset the estimated flux to the second limit based on determining that the estimated flux satisfies the first limit.

According to some implementations, a method may include receiving, by a device, a control signal for operating a switched reluctance machine, the control signal including information relating to one or more of a target speed, a target torque, or a load demand; determining, by the device, a switching command based on the control signal, the switching command being configured to cause a converter circuit to control a phase current through a phase winding of the switched reluctance machine; determining, by the device, an estimated flux of the phase winding based on a bus voltage of the converter circuit, a phase voltage of the phase winding, and a mutual voltage associated with the phase winding; determining, by the device, a flux threshold of the phase winding based on the phase current; determining, by the device, a first limit and a second limit relative to the flux threshold, the first limit and the second limit being scaled relative to the flux threshold based on one or more of the target speed, the load demand, or the bus voltage; comparing, by the device, the estimated flux with the first limit; resetting, by the device, the estimated flux to the second limit based on determining that the estimated flux satisfies the first limit; and causing, by the device, an action to be performed in connection with the estimated flux after resetting the estimated flux.

BRIEF DESCRIPTION OF THE DRAWINGS

FIGS. 3A and 3B are diagrams of an example implementation of a control system described herein.

DETAILED DESCRIPTION

Figure 1:
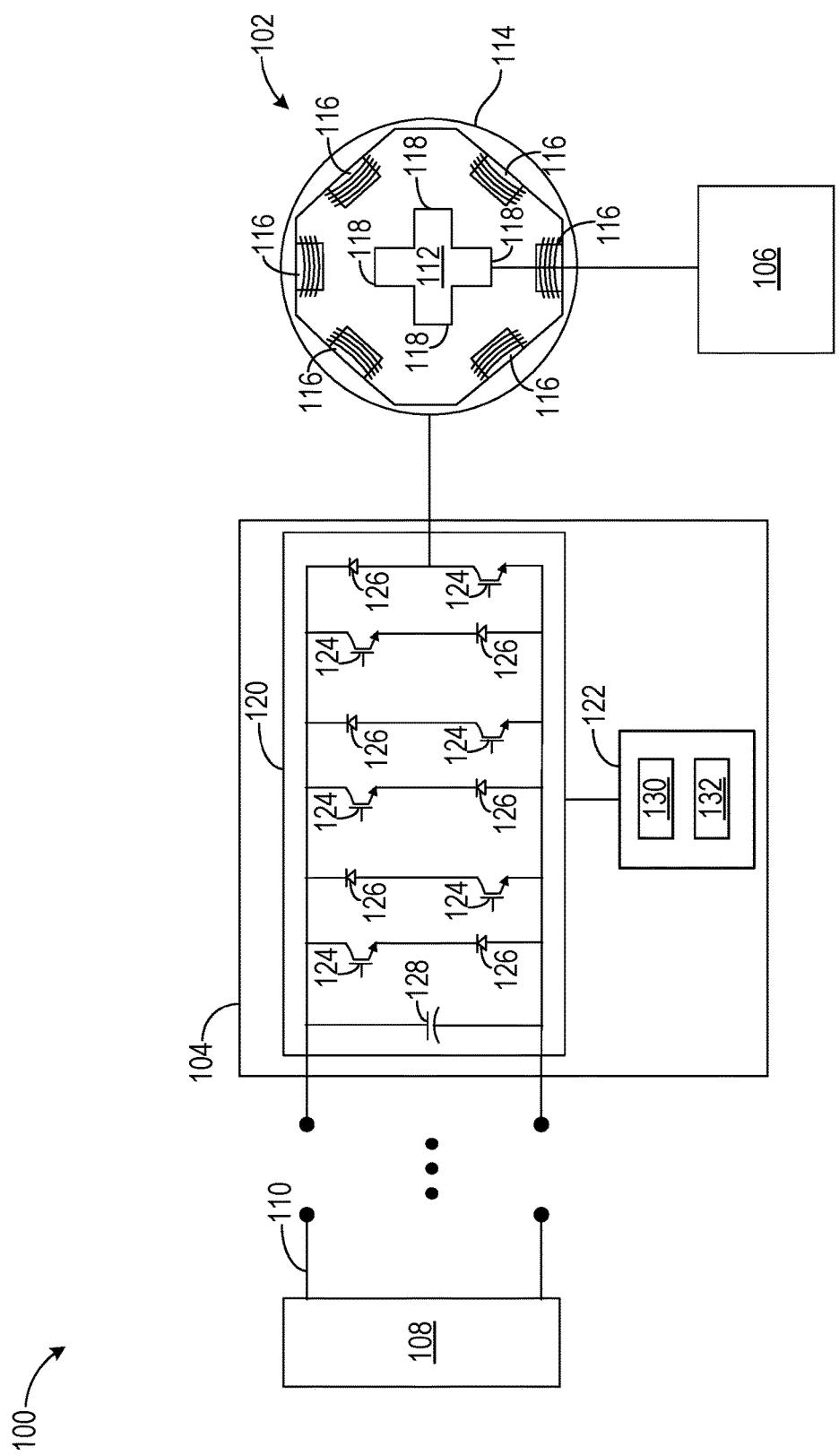
FIG. 1 is a diagram of an example electric drive system described herein.

FIG. 1 is a diagram of an example electric drive system 100 described herein. As shown in FIG. 1, electric drive system 100 may include a switched reluctance machine 102, a control system 104, a mechanical load 106, an electrical load 108, and a common bus 110. Electric drive system 100 may be used in association with a work machine (e.g., a track type tractor, a wheel loader, and/or another type of work machine) to propel the work machine, operate an implement of the work machine, and/or perform another function of the work machine. For example, electric drive system 100 may operate switched reluctance machine 102 in a motoring mode of operation to mechanically operate mechanical load 106, and/or in a generating mode of operation to supply electrical power to electrical load 108. In some examples, mechanical load 106 may be associated with a power source (e.g., a combustion engine) and/or an implement of a work machine. In such cases, electric drive system 100 may operate switched reluctance machine 102 in a motoring mode of operation to propel the work machine and/or operate the implement via mechanical load 106. Additionally, or alternatively, electrical load 108 may be associated with a power source (e.g., a traction motor and/or an electric motor) and/or an implement of a work machine. In such cases, electric drive system 100 may operate switched reluctance machine 102 in a generating mode of operation to propel the work machine and/or operate the implement via electrical load 108.

As further shown in FIG. 1, switched reluctance machine 102 includes a rotor 112 that is rotatably disposed within a fixed stator 114. Stator 114 may include a plurality of phase windings 116 (e.g., three pairs of phase windings 116 for a three-phase switched reluctance machine 102). Rotor 112 may include a plurality of poles 118 (e.g., four poles 118) that are configured to magnetically interact with phase windings 116 of stator 114. Switched reluctance machine 102 may be configured to selectively operate in a motoring mode of operation or a generating mode of operation. In a motoring mode of operation, phase current in one or more phase windings 116 may generate a magnetic field that interacts with poles 118 to cause rotor 112 to rotate relative to stator 114. In a generating mode of operation, rotation of rotor 112 (e.g., caused by mechanical load 106) may cause poles 118 to interact with phase windings 116 in a manner that induces phase current through phase windings 116. Although described in relation to a three-phase switched reluctance machine 102 with six phase windings 116 and four poles 118, in some examples, switched reluctance machine 102 may be configured in another arrangement (e.g., arranged with a different number of phases, arranged with a different number of phase windings 116, arranged with a different number of poles 118, and/or the like).

As further shown in FIG. 1, control system 104 includes a converter circuit 120 and a control device 122. Converter circuit 120 includes sets of switches 124 and diodes 126 that are configured to selectively enable electrical communication between phase windings 116 of stator 114 and common bus 110. As shown for the example in FIG. 1, converter circuit 120 may include three sets of two switches 124 and two diodes 126 to control phase current supplied to and/or received from corresponding sets of phase windings 116. In some examples, converter circuit 120 may include an energy storage device 128 (e.g., an ultracapacitor, a battery, and/or the like) that is configured to maintain electrical communication between converter circuit 120 and common bus 110. In some examples, converter circuit 120 may include a different arrangement of switches 124, diodes 126, and energy storage device 128 for operating the three-phase switched reluctance machine 102 and/or another type of switched reluctance machine 102. Control device 122 includes a processor 130 and a memory 132. Processor 130 is implemented in hardware, firmware, and/or a combination of hardware and software capable of being programmed to perform a function associated with electric drive system 100, control system 104, and/or switched reluctance machine 102. Memory 132 includes a random-access memory (RAM), a read only memory (ROM), and/or another type of dynamic or static storage device that stores information and/or instructions to be performed by processor 130.

In some implementations, control device 122 may be in electrical communication with switches 124 of converter circuit 120 and configured to selectively enable communication of phase current between individual phase windings 116 and common bus 110 according to a switching command and a desired mode of operation. In a motoring mode, control device 122 may use a switching command configured to adjust a rotor position of switched reluctance machine 102, adjust a rotor speed of switched reluctance machine 102, adjust a torque output of switched reluctance machine 102, adjust a rotational direction of rotor 112, and/or the like. In a generating mode, control device 122 may use a switching command configured to selectively supply phase current in phase windings 116 to common bus 110. In some examples, control device 122 may be integrated with or include an engine control module (ECM), an engine control unit (ECU), and/or another controller of an associated work machine. For example, control device 122 may be configured to control functions associated with switched reluctance machine 102 in conjunction with functions associated with an engine, an electric motor, a generator, a traction motor, an implement, and/or another component of an associated work machine. Additionally, or alternatively, control device 122 may be implemented as a dedicated controller that is provided separately from a controller of an associated work machine and configured to control functions associated with switched reluctance machine 102.

In some implementations, control device 122 may be configured to receive a control signal for operating switched reluctance machine 102. For example, the control signal may include information relating to a target speed (e.g., a target rotor speed of switched reluctance machine 102), a target torque (e.g., a target torque output of switched reluctance machine 102), and/or the like. In some examples, the control signal may include a target travel speed of an associated work machine, a target torque output of a traction device and/or a drive shaft of the work machine, a load demand of the work machine, and/or another operating parameter that can be used to derive the target speed and/or the target torque of switched reluctance machine 102. The control signal may correspond to an operator input that is received via a user interface of an associated work machine, from a separate controller (e.g., an ECM, an ECU, and/or the like) of a work machine, and/or the like. Control device 122 may be configured to determine the switching command based on the control signal (e.g., based on the target speed, the target torque, the load demand, and/or another operating parameter that may be included in the control signal). In some examples, control device 122 may determine the switching command with reference to a lookup table, a lookup map, and/or another reference model that interrelates different switching commands with different combinations of target speed, target torque, load demand, and/or the like.

In some implementations, control device 122 may determine the switching command based on a control scheme that corresponds to an operating speed (e.g., a rotor speed) of switched reluctance machine 102. For example, control device 122 may use a diagnostic pulse control scheme for low operating speeds (e.g., rotor speeds that are less than a base speed of switched reluctance machine 102), and a main pulse control scheme for high operating speeds (e.g., rotor speeds that are greater than or equal to a base speed of switched reluctance machine 102). A base speed of switched reluctance machine 102 may be defined as a maximum operating speed at which switched reluctance machine 102 is able to output constant torque and before torque output begins to decrease proportionally in relation to the operating speed. In some examples, control device 122 may differentiate between different types of main pulse control schemes for high operating speeds and very high operating speeds (e.g., rotor speeds that exceed a rated operating speed of switched reluctance machine 102). For example, control device 122 may use a discontinuous conduction main pulse control scheme for high operating speeds (e.g., rotor speeds that are greater than or equal to a base speed of switched reluctance machine 102, but less than or equal to a rated operating speed of switched reluctance machine 102), and a continuous conduction main pulse control scheme for very high operating speeds (e.g., rotor speeds that exceed a rated operating speed of switched reluctance machine 102).

In some implementations, control device 122 may be configured to estimate respective flux through individual phase windings 116 of switched reluctance machine 102. For example, control device 122 may determine an estimated flux of a phase winding 116 based on a phase voltage of phase winding 116 and/or a mutual voltage associated with phase winding 116. Control device 122 may determine the phase voltage based on a bus voltage of common bus 110, a switching command used to enable phase current through phase winding 116, an electrical property of switched reluctance machine 102, and/or a reference model (e.g., a lookup table, a lookup map, and/or the like) that interrelates different phase voltages with different operating conditions of switched reluctance machine 102. Control device 122 may determine the mutual voltage of phase winding 116 based on a mutual flux (e.g., magnetic flux induced by an adjacent or another phase winding 116 of switched reluctance machine 102), a measured phase current through an adjacent or another phase winding 116, an estimated rotor position relative to an adjacent or another phase winding 116, and/or a reference model (e.g., a lookup table, a lookup map, and/or the like) that interrelates different mutual voltages with different combinations of mutual flux, measured phase current, estimated rotor position, and/or the like. Additionally, or alternatively, control device 122 may determine the estimated flux of phase winding 116 based on the phase voltage, the mutual voltage, and/or a stator voltage (e.g., a voltage associated with an internal resistance of stator 114).

In some implementations, control device 122 may be configured to determine the estimated flux of phase winding 116 based on a decoupled voltage of phase winding 116. For example, the decoupled voltage of phase winding 116 may correspond to a phase voltage associated with phase winding 116 that is decoupled from voltage associated with other phase windings 116 (e.g., mutual voltage) and/or other sources (e.g., stator voltage). In some examples, control device 122 may determine the decoupled voltage of phase winding 116 based on a difference between the phase voltage and the mutual voltage. If a stator voltage was determined, control device 122 may determine the decoupled voltage based on a difference between the phase voltage, the mutual voltage, and the stator voltage. Control device 122 may be configured to determine the estimated flux (e.g., decoupled flux) through phase winding 116 based on the decoupled voltage. For example, control device 122 may be configured to integrate the decoupled voltage to determine the estimated flux according to:

$$\lambda = \smallint\!\!\smallint (v - iR) dt \qquad (1)$$

where λ represents flux linkage, v represents phase voltage, i represents phase current, R represents a resistance of phase winding 116, and t represents time. In some examples, control device 122 may determine the estimated flux using a reference model (e.g., a lookup table, a lookup map, and/or the like) that is modeled based on equation (1) and/or the like.

In some implementations, control device 122 may be configured to determine an estimated phase current of phase winding 116 based on the estimated flux. For example, control device 122 may refer to a reference model (e.g., a lookup table, a lookup map, and/or the like) that provides an estimated phase current based on an estimated flux, a prior rotor position of switched reluctance machine 102, and/or the like. In some examples, control device 122 may determine a current error (e.g., a difference between the estimated phase current and the measured phase current), and determine a rotor position and/or a rotor speed of switched reluctance machine 102 based on the current error. For example, control device 122 may estimate the rotor position according to:

$$\frac{d\theta}{dt} = \omega + K_\theta * \text{sgn}(ef) \quad (2)$$

where θ represents rotor position, t represents time, ω represents rotor speed, $K_\theta$ represents a gain to be applied to the rotor position, and sgn(ef) represents a sign function of current error (e.g., a difference between a measured phase current and an estimated phase current). Control device 122 may estimate the rotor speed according to:

$$\frac{d\omega}{dt} = K_\omega * \text{sgn}(ef) \quad (3)$$

where ω represents rotor speed, t represents time, $K_\omega$ represents a gain to be applied to the rotor speed, and sgn(ef) represents a sign function of current error. In some examples, control device 122 may adjust the switching command based on the rotor position and/or the rotor speed.

In some implementations, control device 122 may determine a flux threshold associated with phase winding 116 based on the measured phase current. The flux threshold may be used to bind the estimated flux within values that are acceptable for a particular set of operating conditions and reduce further accumulation of an error that may be present in the flux estimation. For example, when switched reluctance machine 102 is operating at low operating speeds (e.g., via a diagnostic pulse control scheme) or at very high operating speeds (e.g., via a continuous conduction main pulse control scheme), flux through phase windings 116 may not have adequate opportunity to reset between cycles. Without an ability to reset and clear potential errors, the estimated flux may continue to increase (e.g., in a motoring mode) or decrease (e.g., in a generating mode) beyond acceptable values and accumulate errors. Accordingly, control device 122 may define the flux threshold as a flux saturation limit of phase winding 116. For example, the flux threshold in a motoring mode may be defined as an upper flux threshold of an aligned phase winding 116 (e.g., a phase winding 116 that is aligned with a pole 118 of rotor 112), and the flux threshold in a generating mode may be defined as a lower flux threshold of an unaligned phase winding 116 (e.g., a phase winding 116 that is not aligned with a pole 118 of rotor 112). Control device 122 may determine the flux threshold based on a measured phase current and/or a reference model (e.g., a lookup table, a lookup map, and/or the like) that interrelates different flux thresholds with different combinations of flux saturation limits, measured phase current, and/or the like.

In some implementations, control device 122 may determine a set of limits that are scaled relative to the flux threshold. The limits may be used to control or reduce flux saturation that may occur when the estimated flux reaches or approaches the flux threshold, which may result in integration drift and inaccurate rotor position and/or speed estimations. For example, control device 122 may determine a first limit and a second limit that are scaled relative to the flux threshold by respective gains. Control device 122 may determine the respective gains of the first limit and the second limit based on the target speed, the load demand, the bus voltage, and/or another operating parameter associated with switched reluctance machine 102. In a motoring mode, such as when the flux threshold is an upper flux threshold, the first limit may be determined to be less than or greater than the flux threshold, and the second limit may be determined to be less than the first limit. In a generating mode, such as when the flux threshold is a lower flux threshold, the first limit may be determined to be greater than or less than the flux threshold, and the second limit may be determined to be greater than the first limit. The respective scaling and/or gains of the first limit and the second limit may be defined based on:

$$\frac{d\lambda}{dt} = v - ir - K_\lambda * \text{sgn}(ef) \quad (4)$$

where λ represents flux linkage, t represents time, v represents phase voltage, i represents phase current, R represents a resistance of phase winding 116, $K_\lambda$ represents the gain to be applied to scale the flux threshold, and sgn(ef) represents a sign function of current error (e.g., a difference between a measured phase current and an estimated phase current). The first limit and the second limit and/or the respective gains may be dynamically adjusted (e.g., intermittently, periodically, and/or continuously in real-time) based on the target speed, the load demand, and/or the bus voltage.

In some implementations, control device 122 may be configured to compare the estimated flux with the first limit, and reset the estimated flux to the second limit based on determining that the estimated flux satisfies the first limit. For example, in a motoring mode, such as when the flux threshold is an upper flux threshold, the first limit may be defined to be less than or greater than the flux threshold, and the second limit may be defined to be less than the first limit. If the estimated flux rises to the first limit, control device 122 may reset (e.g., decrease) the estimated flux to the second limit. In a generating mode, such as when the flux threshold is a lower flux threshold, the first limit may be defined to be greater than or less than the flux threshold, and the second limit may be defined to be greater than the first limit. If the estimated flux falls to the first limit, control device 122 may reset (e.g., increase) the estimated flux to the second limit. Control device 122 may monitor the estimated flux relative to the first limit (e.g., intermittently, periodically, and/or continuously in real-time), and continue resetting the estimated flux in this manner for as long as switched reluctance machine 102 operates at low operating speeds (e.g., via a diagnostic pulse control scheme) or very high operating speeds (e.g., via a continuous conduction main pulse control scheme). If the first limit is greater than the upper flux threshold or less than the lower flux threshold, the calculated flux estimate is allowed to reach the first limit before resetting to the second limit, though the estimated flux used in control device 122 is limited by the flux threshold. In this way, control device 122 is able to prevent flux saturation, allow the estimated flux to adjust to a more accurate value, and reduce opportunities for error in estimating rotor position and/or rotor speed.

In some implementations, control device 122 may be configured to cause an action to be performed in connection with the estimated flux after resetting the estimated flux. In some examples, control device 122 may determine an estimated phase current of phase winding 116 based on the scaled and reset estimated flux. For example, control device 122 may refer to a reference model (e.g., a lookup table, a lookup map, and/or the like) that provides an estimated phase current based on the estimated flux, a prior rotor position of switched reluctance machine 102, and/or the like. In some examples, control device 122 may determine a current error between the estimated phase current and the measured phase current (e.g., a difference between a measured phase current and an estimated phase current, a sign function of a difference between a measured phase current and an estimated phase current, and/or the like). Control device 122 may determine a rotor position and/or speed of switched reluctance machine 102 based on the current error. In some examples, control device 122 may determine a rotor position based on the current error and determine the rotor speed of switched reluctance machine 102 based on the rotor position (e.g., based on a derivation of or a change in the rotor position with respect to time). In some examples, control device 122 may generate and/or adjust the switching command for controlling switched reluctance machine 102 (e.g., via converter circuit 120) based on the rotor position and/or the rotor speed.

As further shown in FIG. 1, mechanical load 106 includes a traction device, a drive shaft associated with a traction device, an implement, and/or another mechanically operated component of a work machine associated with switched reluctance machine 102. For example, mechanical load 106 may be operatively coupled to rotor 112 of switched reluctance machine 102 and caused to be operated during a motoring mode of switched reluctance machine 102. In some examples, mechanical load 106 may cause rotor 112 of switched reluctance machine 102 to be rotated to supply electrical power to common bus 110 during a generating mode of operation (e.g., during a regenerative braking mode, a dynamic braking mode, and/or the like). In some examples, mechanical load 106 may include a power source of an associated work machine (e.g., a combustion engine with an output drive shaft that is coupled to rotor 112 of switched reluctance machine 102). In such cases, switched reluctance machine 102 may be operated as a generator that is configured to convert mechanical input provided by mechanical load 106 into electrical power that is supplied to common bus 110 and/or one or more electrical loads 108 connected to common bus 110. In some cases, switched reluctance machine 102 may be operated as a starter motor that is configured to cause ignition of mechanical load 106 (e.g., by rotating or turning an output drive shaft of a combustion engine).

As further shown in FIG. 1, electrical load 108 includes an accessory device, an auxiliary device, an implement, and/or another electrically operated component of a work machine associated with switched reluctance machine 102. For example, electrical load 108 may be in electrical communication with phase windings 116 of stator 114 via common bus 110 (e.g., connected in parallel across terminals of common bus 110) and configured to selectively receive the bus voltage. Electrical load 108 may include circuitry (e.g., an inverter circuit, a converter circuit, and/or the like) configured to convert the bus voltage to an appropriate supply voltage of electrical load 108. In some examples, electrical load 108 may include a traction motor (e.g., an electric motor and/or the like) that is electrically operated based on the bus voltage supplied by switched reluctance machine 102 and configured to propel a work machine. Additionally, or alternatively, electrical load 108 may include a power source of an associated work machine. For example, electrical load 108 may include a battery, a generator, and/or another electrical power source that is configured to at least partially supply the bus voltage of common bus 110 for use by switched reluctance machine 102. In such cases, switched reluctance machine 102 may be operated as a motor that is configured to operate mechanical load 106 based on electrical power provided by electrical load 108.

As further shown in FIG. 1, common bus 110 includes a set of terminals (e.g., a set of positive terminals, negative terminals, and/or ground terminals) configured to communicate a bus voltage (e.g., a direct current (DC) link voltage) between control system 104 and one or more electrical loads 108 that are connected to common bus 110. For example, common bus 110 may enable control system 104 and/or electrical load 108 to connect in parallel across the terminals of common bus 110 to at least partially receive the bus voltage. In some examples, common bus 110 may be provided with circuitry (e.g., an inverter circuit, a converter circuit, and/or the like) configured to convert the bus voltage to appropriate supply voltages for operating control system 104 and/or electrical load 108. In some examples, common bus 110 may be configured to communicate with other components and/or other systems associated with electric drive system 100 and/or a work machine associated with electric drive system 100.

As indicated above, FIG. 1 is provided as an example. Other examples may differ from what is described in connection with FIG. 1.

Figure 2:
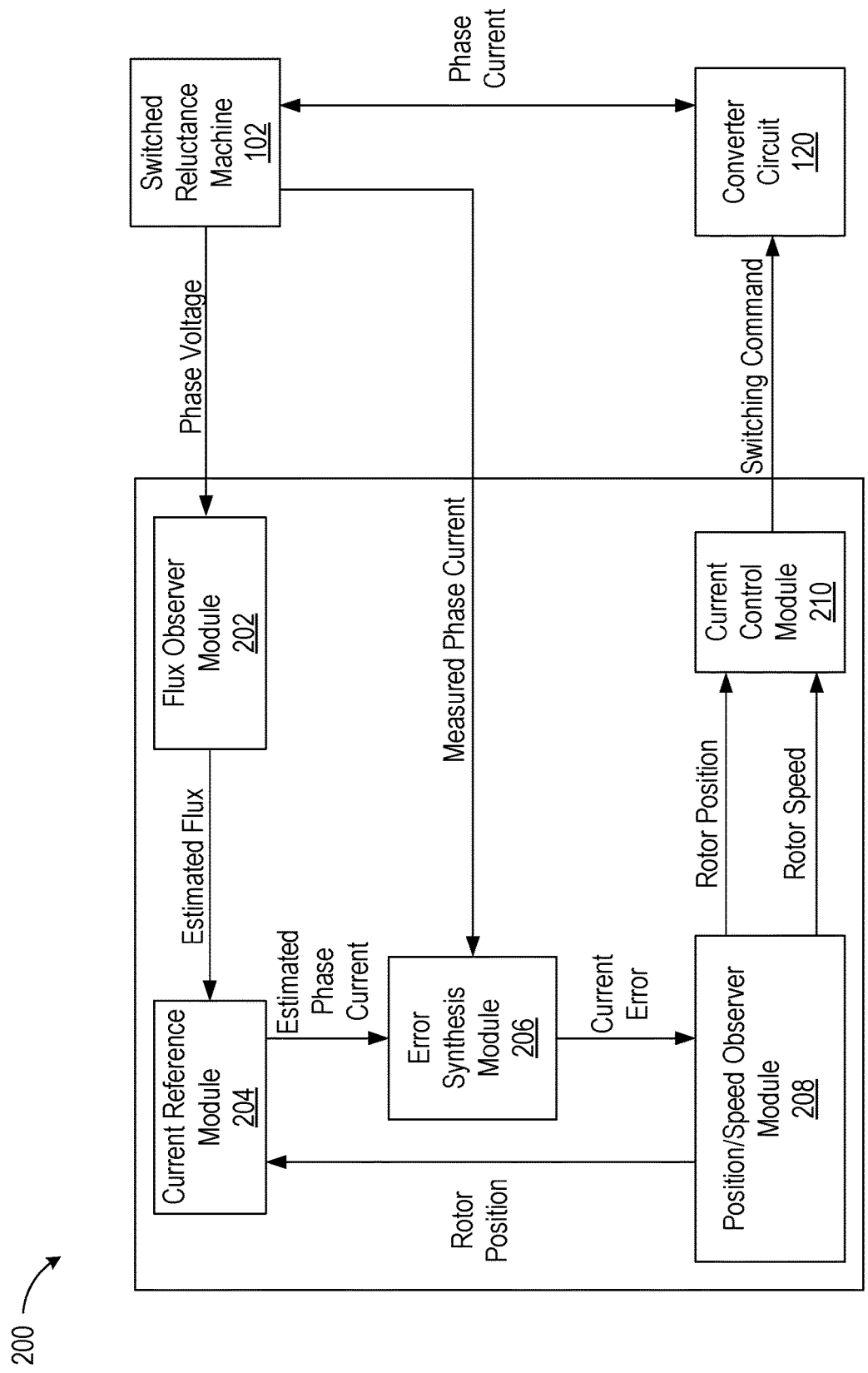
FIG. 2 is a diagram of an example control device described herein.

FIG. 2 is a diagram of an example control device 200 (e.g., control device 122 in FIG. 1) described herein. As shown in FIG. 2, control device 200 may include a flux observer module 202, a current reference module 204, an error synthesis module 206, a position/speed observer module 208, and a current control module 210 configured to perform one or more functions associated with operating switched reluctance machine 102. In some examples, control device 200 may be configured with fewer modules, additional modules, and/or a different arrangement of modules that are configured to perform one or more of the functions associated with operating switched reluctance machine 102. Control device 200 may be in electrical communication with converter circuit 120 and configured to selectively enable communication of phase current between switched reluctance machine 102 and converter circuit 120 according to a switching command. In a motoring mode of operation, control device 200 may use a switching command configured to adjust a rotor position of switched reluctance machine 102, adjust a rotor speed of switched reluctance machine 102, adjust a torque output of switched reluctance machine 102, adjust a rotational direction of switched reluctance machine 102, and/or the like. In a generating mode of operation, control device 200 may use a switching command configured to selectively source phase current from switched reluctance machine 102 (e.g., to common bus 110 and/or electrical load 108).

As further shown in FIG. 2, flux observer module 202 may be configured to receive information relating to a phase voltage of a phase winding 116 from switched reluctance machine 102, and determine an estimated flux based on the phase voltage. For example, flux observer module 202 may determine the phase voltage based on a bus voltage of common bus 110, a switching command used to enable phase current through phase winding 116, an electrical property of switched reluctance machine 102, and/or a reference model (e.g., a lookup table, a lookup map, and/or the like) that interrelates different phase voltages with different operating conditions of switched reluctance machine 102. In some examples, flux observer module 202 may be configured to determine the estimated flux based on a difference between the phase voltage and a mutual voltage of phase winding 116, as described above. Flux observer module 202 may determine the mutual voltage based on a mutual flux, a measured phase current through another phase winding 116, an estimated rotor position relative to another phase winding 116, and/or a reference model (e.g., a lookup table, a lookup map, and/or the like). Additionally, or alternatively, flux observer module 202 may be configured to determine the estimated flux of phase winding 116 based on a difference between the phase voltage and a combination of the mutual voltage and a stator voltage (e.g., a voltage associated with an internal resistance of stator 114).

As further shown in FIG. 2, current reference module 204 may be configured to receive the estimated flux from the flux observer module 202 and an estimated rotor position (e.g., a prior rotor position of switched reluctance machine 102) from position/speed observer module 208, and determine an estimated phase current of phase winding 116 based on the estimated flux. For example, current reference module 204 may refer to a reference model (e.g., a lookup table, a lookup map, and/or the like) that provides an estimated phase current based on the estimated flux, the estimated rotor position, and/or the like. Error synthesis module 206 may be configured to receive the estimated phase current from the current reference module 204 and a measured phase current from switched reluctance machine 102, and determine a current error (e.g., a difference between the estimated phase current and the measured phase current). In some examples, the current error may be determined using a sign function (e.g., providing an indication of whether the estimated phase current is less than, the same, or greater than the measured phase current). Position/speed observer module 208 may be configured to receive the current error from error synthesis module 206, and determine a rotor position and/or a rotor speed of switched reluctance machine 102 based on the current error. Current control module 210 may be configured to receive the rotor position and/or the rotor speed from position/speed observer module 208, and generate a switching command to be used by converter circuit 120 to control phase current of switched reluctance machine 102.

In some implementations, flux observer module 202 may be configured to determine a flux threshold associated with phase winding 116 based on the measured phase current. For example, flux observer module 202 may define the flux threshold as a flux saturation limit of phase winding 116 that is determined based on a measured phase current and/or a reference model (e.g., a lookup table, a lookup map, and/or the like) that interrelates different flux thresholds with different combinations of flux saturation limits, measured phase current, and/or the like. The flux threshold in a motoring mode may be an upper flux threshold, and the flux threshold in a generating mode may be a lower flux threshold. In some examples, flux observer module 202 may be configured to determine a first limit and a second limit that are scaled relative to the flux threshold by respective gains and based on a target speed, a load demand, and/or a bus voltage associated with switched reluctance machine 102. In a motoring mode, the first limit may be determined to be less than or greater than the flux threshold, and the second limit may be determined to be less than the first limit. In a generating mode, the first limit may be determined to be greater than or less than the flux threshold, and the second limit may be determined to be greater than the first limit. The respective gains of the first limit and the second limit may be dynamically adjusted (e.g., intermittently, periodically, and/or continuously in real-time) based on a change in the target speed, the load demand, and/or the bus voltage.

In some implementations, flux observer module 202 may be configured to compare the estimated flux with the first limit, and reset the estimated flux to the second limit based on determining that the estimated flux satisfies the first limit. For example, in a motoring mode, such as when the flux threshold is an upper flux threshold, the first limit may be defined to be less than or greater than the flux threshold, and the second limit may be defined to be less than the first limit. If the estimated flux rises to the first limit, flux observer module 202 may reset (e.g., decrease) the estimated flux to the second limit. In a generating mode, such as when the flux threshold is a lower flux threshold, the first limit may be defined to be greater than or less than the flux threshold, and the second limit may be defined to be greater than the first limit. If the estimated flux falls to the first limit flux observer module 202 may reset (e.g., increase) the estimated flux to the second limit. Flux observer module 202 may monitor the estimated flux relative to the first limit (e.g., intermittently, periodically, and/or continuously in real-time), and continue resetting the estimated flux in this manner for as long as switched reluctance machine 102 operates at low operating speeds (e.g., via a diagnostic pulse control scheme) or very high operating speeds (e.g., via a continuous conduction main pulse control scheme). If the first limit is greater than the upper flux threshold or less than the lower flux threshold, the calculated flux estimate is allowed to reach the first limit before resetting to the second limit, though the estimated flux provided by flux observer module 202 is limited by the flux threshold. In this way, flux observer module 202 reduces flux saturation, allows the estimated flux to adjust to a more accurate value, and reduces opportunities for error in rotor position and/or speed estimations.

As indicated above, FIG. 2 is provided as an example. Other examples may differ from what is described in connection with FIG. 2.

FIGS. 3A and 3B are diagrams of an example implementation 300 of control system 104 described herein. As shown in FIG. 3A, and by reference number 302, control system 104 may determine an upper flux threshold 304 associated with a phase winding 116 of switched reluctance machine 102 during a motoring mode of operation. Control system 104 may determine a set of limits relative to flux threshold 304, as described above. For example, control system 104 may determine a first limit 306 and a second limit 308 that are scaled relative to flux threshold 304 by respective gains and based on a target speed, a load demand, and/or a bus voltage associated with switched reluctance machine 102. As shown for the example in FIG. 3A, first limit 306 may be scaled to be less than flux threshold 304 (e.g., approximately 95% of flux threshold 304) and second limit 308 may be scaled to be less than first limit 306 (e.g., approximately 90% of flux threshold 304) in a particular instance. If an estimated flux 310 reaches (e.g., rises to) first limit 306, control system 104 may reset (e.g., decrease) estimated flux 310 to second limit 308. Control system 104 may monitor estimated flux 310 relative to first limit 306, and continue resetting estimated flux 310 to second limit 308 in this manner such that estimated flux 310 does not reach flux threshold 304 and such that estimated flux 310 does not saturate at flux threshold 304. First limit 306 and second limit 308 may be dynamically adjusted (e.g., intermittently, periodically, and/or continuously in real-time) based on a change in the target speed, the load demand, and/or the bus voltage. In other examples, the first limit 306 may be scaled to be greater than flux threshold 304 and second limit 308 may be scaled to be less than first limit 306.

As shown in FIG. 3B, and by reference number 312, control system 104 may determine a lower flux threshold 314 associated with a phase winding 116 of switched reluctance machine 102 during a generating mode of operation. Control system 104 may determine a set of limits relative to flux threshold 304, as described above. For example, control system 104 may determine a first limit 316 and a second limit 318 that are scaled relative to flux threshold 314 by respective gains and based on a target speed, a load demand, and/or a bus voltage associated with switched reluctance machine 102. As shown for the example in FIG. 3B, first limit 316 may be scaled to be greater than flux threshold 314 (e.g., approximately 105% of flux threshold 304) and second limit 318 may be scaled to be greater than first limit 316 (e.g., approximately 110% of flux threshold 314) in a particular instance. If an estimated flux 320 reaches (e.g., falls to) first limit 316, control system 104 may reset (e.g., increase) estimated flux 320 to second limit 318. Control system 104 may monitor estimated flux 320 relative to first limit 316, and continue resetting estimated flux 320 to second limit 318 in this manner such that estimated flux 320 does not reach flux threshold 314 and such that estimated flux 320 does not saturate at flux threshold 314. First limit 316 and second limit 318 may be dynamically adjusted (e.g., intermittently, periodically, and/or continuously in real-time) based on a change in the target speed, the load demand, and/or the bus voltage. In other examples, the first limit 306 may be scaled to be less than flux threshold 304 and second limit 308 may be scaled to be greater than first limit 306.

As indicated above, FIGS. 3A and 3B are provided as an example. Other examples may differ from what is described in connection with FIGS. 3A and 3B.

Figure 4:
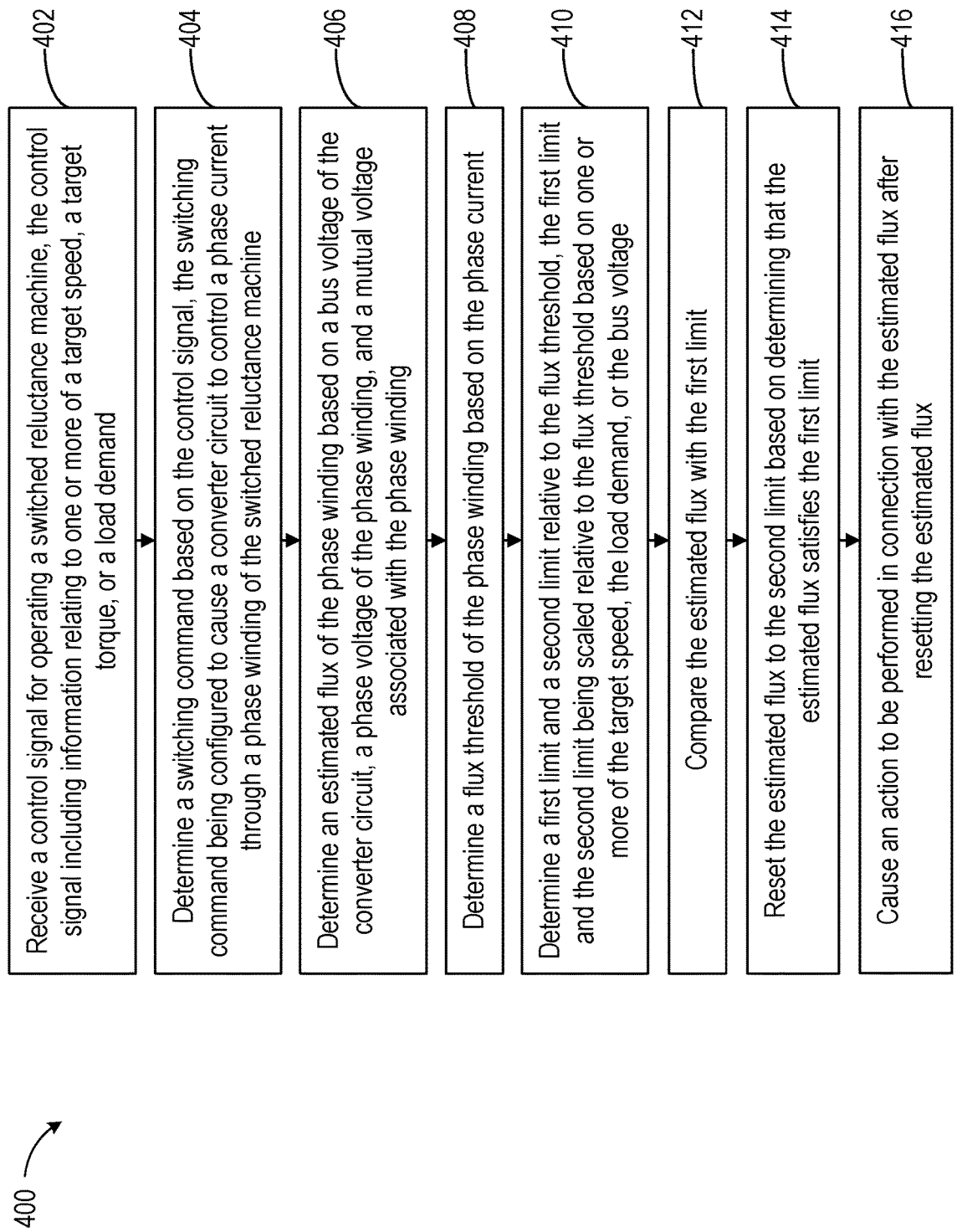
FIG. 4 is a flow chart of an example process for controlling a switched reluctance machine.

FIG. 4 is a flow chart of an example process 400 for controlling a switched reluctance machine. One or more process blocks of FIG. 4 may be performed by a control device (e.g., control device 122 of electric drive system 100 or control device 200) and/or by another component or a group of components separate from or including the control device (e.g., control system 104, converter circuit 120, flux observer module 202, current reference module 204, error synthesis module 206, position/speed observer module 208, current control module 210, and/or the like).

As shown in FIG. 4, process 400 may include receiving a control signal for operating a switched reluctance machine, the control signal including information relating to one or more of a target speed, a target torque, or a load demand (block 402). For example, the control device (e.g., using processor 130, memory 132, and/or the like) may receive a control signal for operating a switched reluctance machine, as described above. The control signal may include information relating to one or more of a target speed, a target torque, or a load demand.

As further shown in FIG. 4, process 400 may include determining a switching command based on the control signal, the switching command being configured to cause a converter circuit to control a phase current through a phase winding of the switched reluctance machine (block 404). For example, the control device (e.g., using processor 130, memory 132, and/or the like) may determine a switching command based on the control signal, as described above. The switching command may be configured to cause a converter circuit to control a phase current through a phase winding of the switched reluctance machine.

As further shown in FIG. 4, process 400 may include determining an estimated flux of the phase winding based on a bus voltage of the converter circuit, a phase voltage of the phase winding, and a mutual voltage associated with the phase winding (block 406). For example, the control device (e.g., using processor 130, memory 132, and/or the like) may determine an estimated flux of the phase winding based on a bus voltage of the converter circuit, a phase voltage of the phase winding, and a mutual voltage associated with the phase winding, as described above.

As further shown in FIG. 4, process 400 may include determining a flux threshold of the phase winding based on the phase current (block 408). For example, the control device (e.g., using processor 130, memory 132, and/or the like) may determine a flux threshold of the phase winding based on the phase current, as described above.

As further shown in FIG. 4, process 400 may include determining a first limit and a second limit relative to the flux threshold, the first limit and the second limit being scaled relative to the flux threshold based on one or more of the target speed, the load demand, or the bus voltage (block 410). For example, the control device (e.g., using processor 130, memory 132, and/or the like) may determine a first limit and a second limit relative to the flux threshold, as described above. The first limit and the second limit may be scaled relative to the flux threshold based on one or more of the target speed, the load demand, or the bus voltage.

As further shown in FIG. 4, process 400 may include comparing the estimated flux with the first limit (block 412). For example, the control device (e.g., using processor 130, memory 132, and/or the like) may compare the estimated flux with the first limit, as described above.

As further shown in FIG. 4, process 400 may include resetting the estimated flux to the second limit based on determining that the estimated flux satisfies the first limit (block 414). For example, the control device (e.g., using processor 130, memory 132, and/or the like) may reset the estimated flux to the second limit based on determining that the estimated flux satisfies the first limit, as described above.

As further shown in FIG. 4, process 400 may include causing an action to be performed in connection with the estimated flux after resetting the estimated flux (block 416). For example, the control device (e.g., using processor 130, memory 132, and/or the like) may cause an action to be performed in connection with the estimated flux after resetting the estimated flux, as described above.

Process 400 may include variations and/or additional implementations to those described in connection with FIG. 4, such as any single implementation or any combination of implementations described elsewhere herein. Although FIG. 4 shows example blocks of process 400, in some examples, process 400 may include additional blocks, fewer blocks, different blocks, or differently arranged blocks than those depicted in FIG. 4. Additionally, or alternatively, two or more of the blocks of process 400 may be performed in parallel.

INDUSTRIAL APPLICABILITY

A switched reluctance machine may include a stator with multiple phase windings that magnetically react with magnetic poles of a rotor. The phase windings of the switched reluctance machine may be controlled by a converter circuit and a controller of the converter circuit. For example, the controller may operate switches of the converter circuit according to a switching command to enable or disable phase current between the individual phase windings and a common bus of the converter circuit. In a motoring mode, a bus voltage of the common bus may be selectively applied to the phase windings to cause the rotor to rotate. In a generating mode, rotation of the rotor may generate current through the phase windings that can be selectively sourced to a load via the common bus. A switched reluctance machine is often used with an industrial work machine (e.g., a track type tractor, a wheel loader, and/or the like) that uses an electric drive system. For example, an electric drive system of a work machine may use a combustion engine to power a generator and generate electrical energy that can be used by the switched reluctance machine to propel and/or perform another function of the work machine. The electric drive system may also use the switched reluctance machine to generate electrical energy that can be used to power one or more auxiliary functions and/or accessory components of the work machine.

Efficiency of a switched reluctance machine depends on an ability of a controller of the switched reluctance machine to track a rotor position (e.g., an angular position of the rotor relative to the stator of the switched reluctance machine) and/or a rotor speed (e.g., an angular speed of the rotor relative to the stator) during operation. In some cases, an encoder, a mechanically aligned speed wheel, and/or another type of sensing device may be used to determine rotor position and/or speed. However, such sensor-based arrangements can be costly, complex, and prone to error. Sensorless solutions also exist in which the controller estimates rotor position and/or speed based on electrical properties of the switched reluctance machine. For example, some sensorless solutions estimate flux of a phase winding, estimate a phase current based on the estimated flux, and estimate rotor position and/or speed based on the estimated phase current. Although sensorless solutions overcome some of the drawbacks associated with sensor-based solutions, currently available sensorless solutions are still susceptible to error. For example, under certain operating conditions, the estimated flux may saturate, which can cause an accumulation of error in the estimated phase current as well as in the estimated rotor position and/or speed. In some cases, the estimated flux may be periodically reset by the controller to reduce such accumulated error.

A control system described herein provides a sensorless solution that operates a switched reluctance machine more reliably and efficiently across different ranges of operating speeds. The control system uses a modified flux observer module to determine an estimated flux of a phase winding of the switched reluctance machine and a flux threshold of the phase winding based on a measured phase current of the switched reluctance machine. The control system determines a first limit and a second limit that are respectively scaled relative to the flux threshold based on a target speed, a load demand, and/or a bus voltage associated with the switched reluctance machine. The control system compares the estimated flux with the first limit, resets the estimated flux to the second limit based on determining that the estimated flux satisfies the first limit, and causes an action to be performed in connection with the estimated flux. In some examples, the control system determines an estimated phase current based on the estimated flux, determines a current error between the estimated phase current and the measured phase current, determines a rotor position and/or speed of the switched reluctance machine based on the current error, and adjusts a switching command of a converter circuit of the switched reluctance machine based on the rotor position and/or the rotor speed.

The control system described herein overcomes one or more problems associated with currently available solutions for operating a switched reluctance machine. For instance, the control system provides a sensorless solution that avoids additional costs and unwanted complexity associated with sensor-based solutions. In addition, the modified flux observer module enables the control system to prevent saturation of the estimated flux that often occurs during low and very high operating speeds of a switched reluctance machine. For instance, the control system limits the estimated flux according to a flux threshold, and resets the estimated flux according to a set of limits that are scaled relative to the flux threshold. By resetting the estimated flux according to dynamically scaled limits, the control system enables the estimated flux to adjust to a more accurate value, reduces an opportunity for error in the estimated flux, and reduces an opportunity for error in the resulting estimated phase current. Furthermore, by reducing errors in the estimated phase current, the control system provides more accurate rotor position estimations and/or rotor speed estimations, and operates the switched reluctance machine more efficiently irrespective of operating speed. An efficient switched reluctance machine further aids in conserving energy and/or resources (e.g., battery power, fuel, and/or the like) that may otherwise be consumed by a work machine that relies on the switched reluctance machine.

What is claimed is:
1. An electric drive system, comprising:
a switched reluctance machine including a stator and a rotor rotatably disposed relative to the stator, the stator including a plurality of phase windings, and the rotor including a plurality of poles configured to magnetically interact with the plurality of phase windings;
a converter circuit in electrical communication with the plurality of the phase windings, the converter circuit being configured to control a phase current of a phase winding of the stator according to a switching command; and
a control device in electrical communication with the converter circuit, the control device being configured to:
determine the switching command based on one or more of a target speed, a target torque, or a load demand associated with the switched reluctance machine,
determine an estimated flux of the phase winding based on a bus voltage of the converter circuit, a phase voltage of the phase winding, and a mutual voltage associated with the phase winding,
determine a flux threshold of the phase winding based on the phase current,
determine a first limit and a second limit relative to the flux threshold, the first limit and the second limit being scaled relative to the flux threshold based on one or more of the target speed, the load demand, or the bus voltage, compare the estimated flux with the first limit, and reset the estimated flux to the second limit based on determining that the estimated flux satisfies the first limit.

2. The electric drive system of claim 1, wherein the control device is configured to, when determining the estimated flux:

determine the phase voltage based on the bus voltage and the switching command, determine the mutual voltage associated with the phase winding based on a mutual flux induced by another phase winding of the switched reluctance machine, determine a decoupled voltage of the phase winding based on a difference between the phase voltage and the mutual voltage, and determine the estimated flux based on the decoupled voltage.

3. The electric drive system of claim 1, wherein the control device is configured to, when determining the flux threshold:

determine a flux saturation limit of the phase winding, the flux saturation limit corresponding to the estimated flux of the phase winding upon alignment with a pole of the rotor, and determine the flux threshold based on the flux saturation limit.

4. The electric drive system of claim 1, wherein the control device is configured to, when determining the flux threshold:

determine the flux threshold as an upper flux threshold based on determining that the switched reluctance machine is operating in a motoring mode of operation, or determine the flux threshold as a lower flux threshold based on determining that the switched reluctance machine is operating in a generating mode of operation.

5. The electric drive system of claim 1, wherein the control device is configured to, when determining the first limit and the second limit:

scale the first limit and the second limit relative to the flux threshold by respective gains, the respective gains being determined based on one or more of the target speed, the load demand, or the bus voltage.

6. The electric drive system of claim 1, wherein the control device is further configured to:

determine an estimated phase current based on the estimated flux;

determine a current error between the estimated phase current and the phase current;

determine one or more of a rotor position or a rotor speed of the switched reluctance machine based on the current error; and adjust the switching command based on one or more of the rotor position or the rotor speed.

7. A control system, comprising:

a converter circuit in electrical communication with a phase winding of a switched reluctance machine, the converter circuit being configured to control a phase current of the phase winding according to a switching command; and a control device in electrical communication with the converter circuit, the control device being configured to:

determine the switching command based on one or more of a target speed, a target torque, or a load demand associated with the switched reluctance machine, determine an estimated flux of the phase winding based on a bus voltage of the converter circuit, a phase voltage of the phase winding, and a mutual voltage associated with the phase winding, determine a flux threshold of the phase winding based on the phase current, determine a first limit and a second limit relative to the flux threshold, the first limit and the second limit being scaled relative to the flux threshold based on one or more of the target speed, the load demand, or the bus voltage, compare the estimated flux with the first limit, and reset the estimated flux to the second limit based on determining that the estimated flux satisfies the first limit.

8. The control system of claim 7, wherein the control device is configured to, when determining the estimated flux:

determine the phase voltage based on the bus voltage and the switching command, determine the mutual voltage associated with the phase winding based on a mutual flux induced by another phase winding of the switched reluctance machine, determine a decoupled voltage of the phase winding based on a difference between the phase voltage and the mutual voltage, and determine the estimated flux based on the decoupled voltage.

9. The control system of claim 7, wherein the control device is configured to, when determining the estimated flux:

determine the phase voltage based on the bus voltage and the switching command, determine a stator voltage based on a stator resistance and the phase current, determine a mutual voltage associated with the phase winding based on a mutual flux induced by another phase winding of the switched reluctance machine, determine a decoupled voltage of the phase winding based on a difference between the phase voltage, the stator voltage, and the mutual voltage, and determine the estimated flux based on the decoupled voltage.

10. The control system of claim 7, wherein the control device is configured to, when determining the flux threshold:

determine a flux saturation limit of the phase winding, the flux saturation limit corresponding to the estimated flux of the phase winding upon alignment with a pole of a rotor of the switched reluctance machine, and determine the flux threshold based on the flux saturation limit.

11. The control system of claim 7, wherein the control device is configured to, when determining the flux threshold:

determine the flux threshold as an upper flux threshold based on determining that the switched reluctance machine is operating in a motoring mode of operation, or determine the flux threshold as a lower flux threshold based on determining that the switched reluctance machine is operating in a generating mode of operation.

12. The control system of claim 7, wherein the control device is configured to, when determining the first limit and the second limit:

scale the first limit and the second limit relative to the flux threshold by respective gains, the respective gains being determined based on one or more of the target speed, the load demand, or the bus voltage.

13. The control system of claim 7, wherein the control device is further configured to:
    determine an estimated phase current based on the estimated flux;
    determine a current error between the estimated phase current and the phase current;
    determine a rotor position of the switched reluctance machine based on the current error; and
    adjust the switching command based on the rotor position.

14. A method, comprising:
    receiving, by a device, a control signal for operating a switched reluctance machine,
        the control signal including information relating to one or more of a target speed, a target torque, or a load demand;
    determining, by the device, a switching command based on the control signal,
        the switching command being configured to cause a converter circuit to control a phase current through a phase winding of the switched reluctance machine;
    determining, by the device, an estimated flux of the phase winding based on a bus voltage of the converter circuit, a phase voltage of the phase winding, and a mutual voltage associated with the phase winding;
    determining, by the device, a flux threshold of the phase winding based on the phase current;
    determining, by the device, a first limit and a second limit relative to the flux threshold,
        the first limit and the second limit being scaled relative to the flux threshold based on one or more of the target speed, the load demand, or the bus voltage;
    comparing, by the device, the estimated flux with the first limit;
    resetting, by the device, the estimated flux to the second limit based on determining that the estimated flux satisfies the first limit; and
    causing, by the device, an action to be performed in connection with the estimated flux after resetting the estimated flux.

15. The method of claim 14, wherein determining the estimated flux comprises:
    determining the phase voltage based on the bus voltage and the switching command,
    determining a mutual flux associated with the phase winding induced by an adjacent phase winding of the switched reluctance machine,
        the mutual flux being determined based on a phase current of the adjacent phase winding and a position of a pole of a rotor of the switched reluctance machine relative to the adjacent phase winding,
    determining the mutual voltage associated with the phase winding based on the mutual flux,
    determining a decoupled voltage of the phase winding based on a difference between the phase voltage and the mutual voltage, and
    determining the estimated flux based on the decoupled voltage.

16. The method of claim 14, wherein determining the flux threshold comprises:
    determining a flux saturation limit of the phase winding,
        the flux saturation limit corresponding to the estimated flux of the phase winding upon alignment with a pole of a rotor of the switched reluctance machine, and
    determining the flux threshold based on the flux saturation limit.

17. The method of claim 14, wherein determining the first limit and the second limit comprises:
    scaling the second limit to be less than the flux threshold based on determining that the flux threshold is an upper flux threshold, and
    scaling the first limit to be greater than the second limit.

18. The method of claim 14, wherein determining the first limit and the second limit comprises:
    scaling the second limit to be greater than the flux threshold based on determining that the flux threshold is a lower flux threshold, and
    scaling the first limit to be less than the second limit.

19. The method of claim 14, wherein determining the first limit and the second limit comprises:
    scaling the first limit and the second limit relative to the flux threshold by respective gains,
        the respective gains being determined based on one or more of the target speed, the load demand, or the bus voltage.

20. The method of claim 14, wherein causing the action to be performed comprises:
    determining an estimated phase current based on the estimated flux,
    determining a current error between the estimated phase current and the phase current,
    determining one or more of a rotor position or a rotor speed of the switched reluctance machine based on the current error, and
    adjusting the switching command based on one or more of the rotor position or the rotor speed.

* * * * *